United States Patent
Watson, Jr.

(10) Patent No.: US 7,392,620 B1
(45) Date of Patent: Jul. 1, 2008

(54) ROOF SECURING SYSTEM

(76) Inventor: Arthur D. Watson, Jr., 16774 127th Dr. North, Jupiter, FL (US) 33478

( * ) Notice: Subject to any disclaimer, the term of this patent is extended or adjusted under 35 U.S.C. 154(b) by 0 days.

(21) Appl. No.: 11/581,099

(22) Filed: Oct. 16, 2006

(51) Int. Cl.
*B62D 63/04* (2006.01)
*E04B 1/34* (2006.01)
*E04B 7/00* (2006.01)
*E04D 1/34* (2006.01)
*E04D 5/00* (2006.01)

(52) U.S. Cl. .............................. 52/4; 52/3; 52/5; 52/23; 52/DIG. 11; 52/DIG. 12; 52/DIG. 14

(58) Field of Classification Search ................ 52/3, 52/4, 5, 23, DIG. 11, DIG. 12, DIG. 14
See application file for complete search history.

(56) References Cited

U.S. PATENT DOCUMENTS

| 5,522,184 | A | * | 6/1996 | Oviedo-Reyes | 52/23 |
| 5,579,794 | A | * | 12/1996 | Sporta | 135/88.01 |
| 5,623,788 | A | * | 4/1997 | Bimberg et al. | 52/23 |
| 5,687,512 | A | * | 11/1997 | Spoozak et al. | 52/23 |
| 5,791,090 | A | * | 8/1998 | Gitlin et al. | 52/4 |
| 5,819,477 | A | * | 10/1998 | Gaffney | 52/23 |
| D411,506 | S | | 6/1999 | Davis | |
| 5,983,572 | A | * | 11/1999 | Laboy | 52/23 |
| 6,088,975 | A | * | 7/2000 | Wiegel | 52/169.1 |
| 2002/0166289 | A1 | * | 11/2002 | Oviedo-Reyes | 52/4 |
| 2004/0074152 | A1 | * | 4/2004 | Rogers et al. | 52/3 |
| 2006/0075690 | A1 | * | 4/2006 | Murray | 52/23 |
| 2006/0207191 | A1 | * | 9/2006 | Sutton | 52/4 |
| 2007/0000183 | A1 | * | 1/2007 | Logan | 52/3 |

* cited by examiner

*Primary Examiner*—Robert Canfield
*Assistant Examiner*—Hunter M Dreidame

(57) ABSTRACT

A roof securing system for protecting the roof a structure from being damaged from high winds during a hurricane includes a plurality of panels. Each of the panels is positioned on a roof of a structure to inhibit a roof covering from is removed by the high winds. The panels are selectively coupled together to cover the roof. Each of a plurality of connectors is configured to secure together adjacently positioned ones of the panels. Each of a plurality of traversing straps is positionable adjacent to a juncture of adjacently positioned panels. Each of the traversing straps extends over the roof. Each of a plurality of anchoring pins is coupled to a support surface. Each of a plurality of anchoring straps is coupled to and extends between one of the traversing straps and one of the anchoring pins to secure the traversing straps against the roof.

9 Claims, 4 Drawing Sheets

ROOF SECURING SYSTEM

BACKGROUND OF THE INVENTION

1. Field of the Invention

The present invention relates to structural protective systems and more particularly pertains to a new structural protective system for protecting the roof a structure from being damaged from high winds during a hurricane.

2. Description of the Prior Art

The use of structural protective systems is known in the prior art. The prior art commonly teaches a fabric being positioned over a structure and secured over the structure with a harness of straps to inhibit damage to the structure.

While these devices fulfill their respective, particular objectives and requirements, the need remains for a system that has certain improved features that allows water to pass readily through the system while securing the roof and not catching wind itself. Additionally, the system should include a plurality of panels that are secured together to provide a system that is more easily stored and deployed.

SUMMARY OF THE INVENTION

The present invention meets the needs presented above by generally comprising a plurality of panels. Each of the panels is positioned on a roof of a structure to inhibit a roof covering from being removed by the high winds. The panels are selectively coupled together to cover the roof. Each of a plurality of connectors is configured to secure together adjacently positioned ones of the panels. Each of a plurality of traversing straps is positionable adjacent to a juncture of adjacently positioned panels. Each of the traversing straps extends over the roof. Each of a plurality of anchoring pins is coupled to a support surface. Each of a plurality of anchoring straps is coupled to and extends between one of the traversing straps and one of the anchoring pins to secure the traversing straps against the roof.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
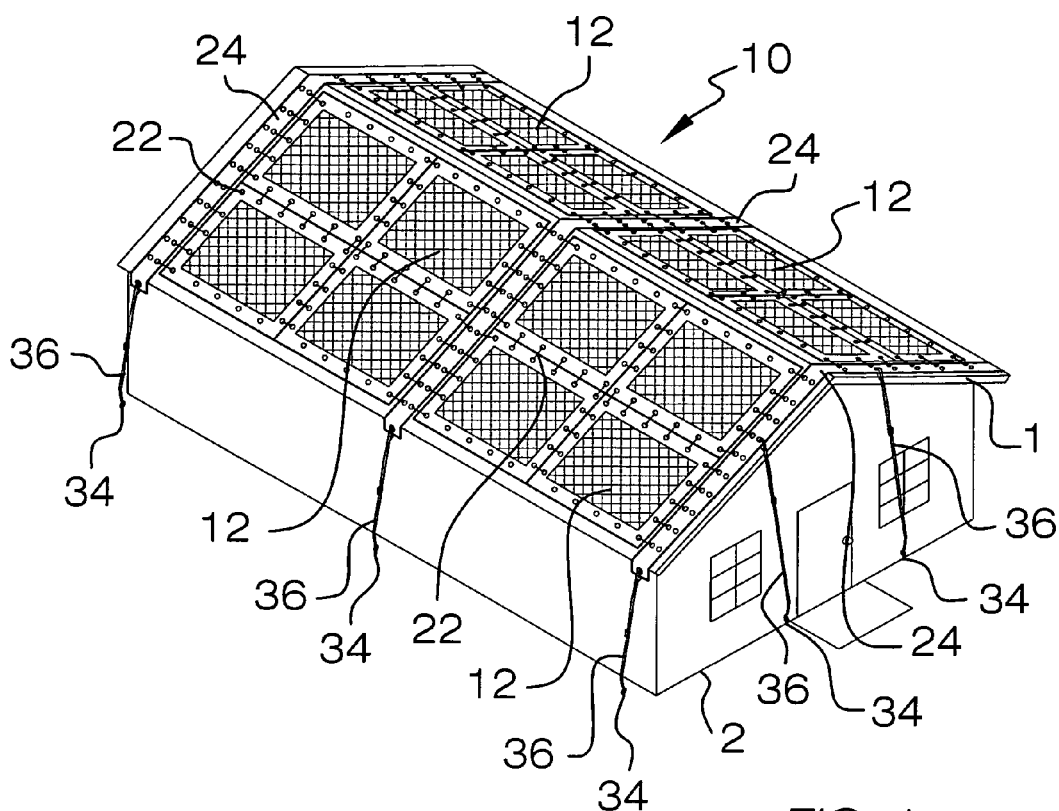
FIG. 1 is a perspective view of a roof securing system according to the present invention in use.
Figure 2:
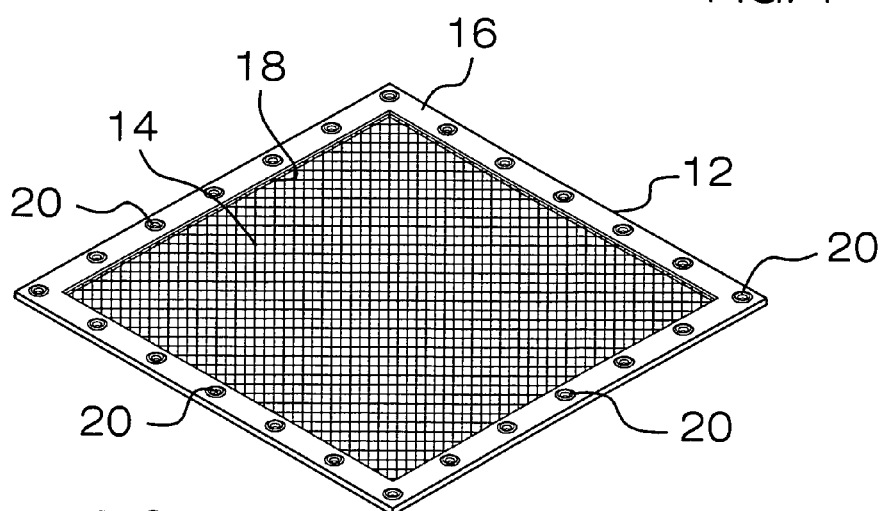
FIG. 2 is a perspective view of one of the panels of the present invention.
Figure 3:
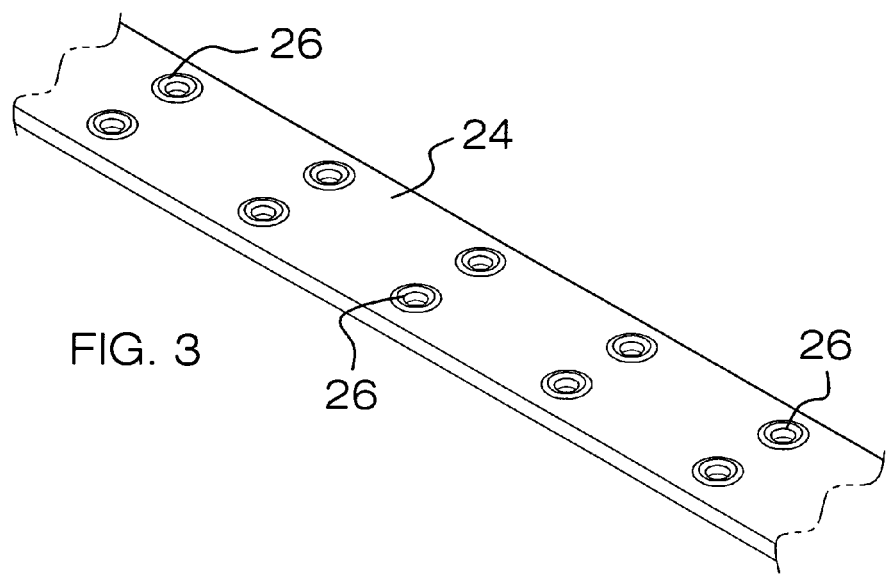
FIG. 3 is an enlarged perspective view of one of the traversing straps of the present invention.
Figure 4:
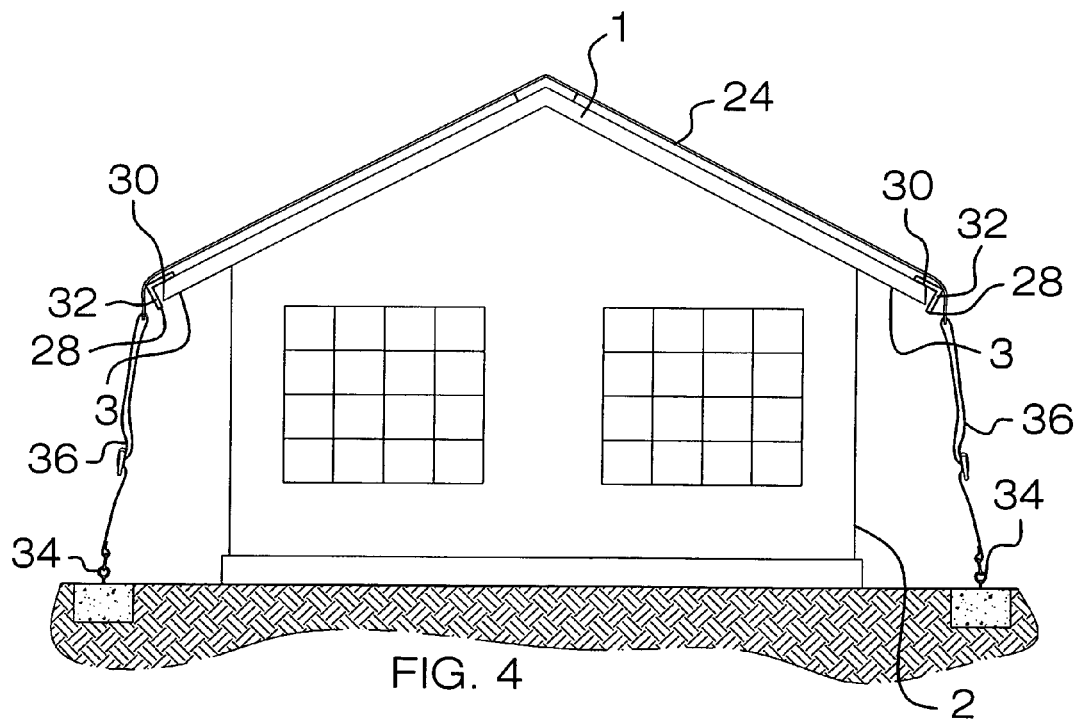
FIG. 4 is a side view of the present invention shown in use.
Figure 5:
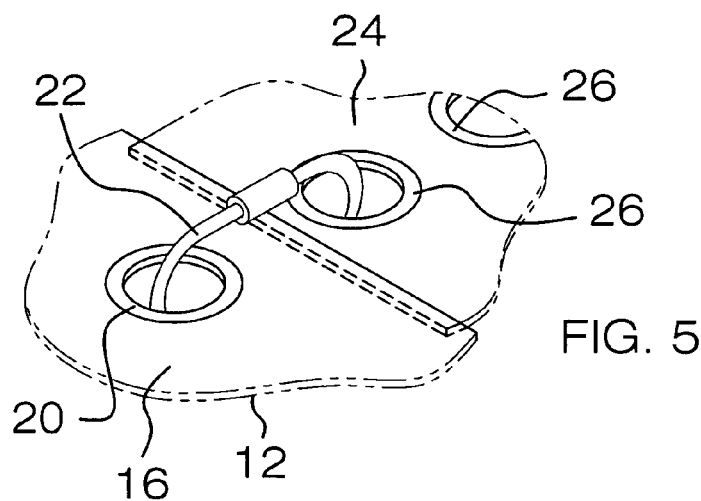
FIG. 5 is an enlarged perspective view of one of the connectors of the present invention.
Figure 6:
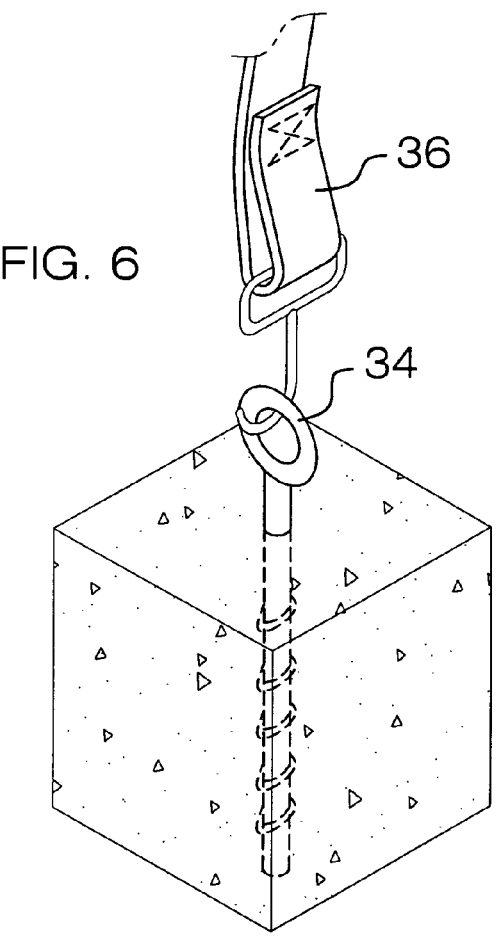
FIG. 6 is an enlarged perspective view of one of the anchoring pins of the present invention.
Figure 7:
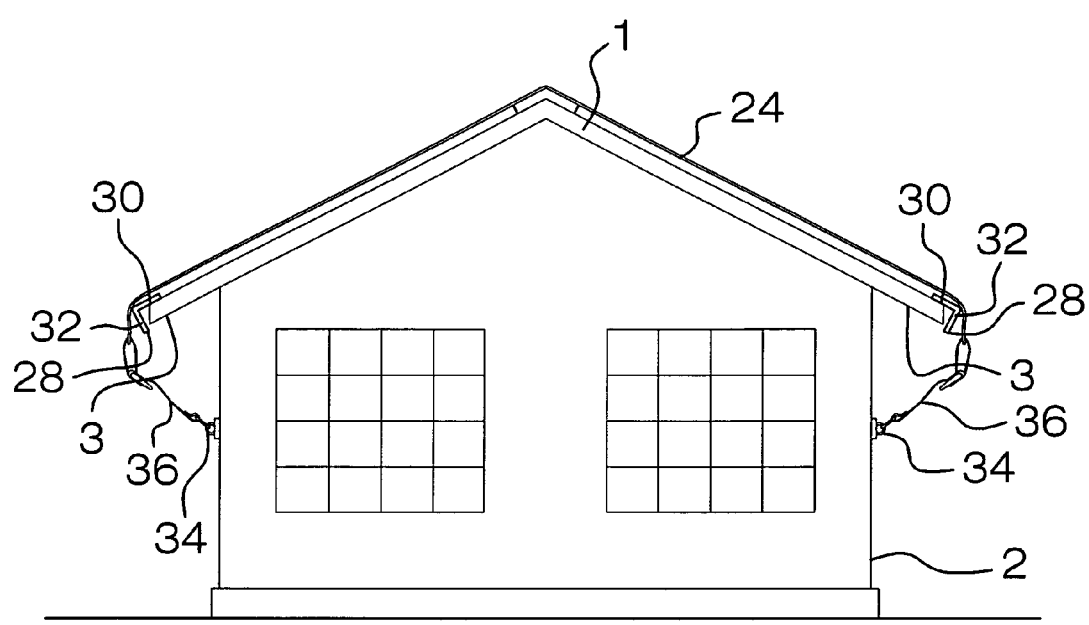
FIG. 7 is a side view of the present invention showing the anchoring pins in an alternate position.

With reference now to the drawings, and in particular to FIGS. 1 through 7 thereof, a new structural protective system embodying the principles and concepts of the present invention and generally designated by the reference numeral 10 will be described.

As best illustrated in FIGS. 1 through 7, the roof securing system 10 generally comprises a plurality of panels 12. Each of the panels 12 is positioned on a roof 1 of a structure 2 to inhibit a roof covering, such as shingles or roof tiles, from being removed by high winds during a hurricane. The panels 12 are selectively coupled together to cover the roof 1. Each of panels 12 includes a mesh portion 14 being liquid permeable. A border portion 16 is coupled to and is coextensive with a perimeter edge 18 of the mesh portion 14. Each of a plurality of panel eyelets 20 is coupled to and extending through the border portion 16.

Each of a plurality of connectors 22 is configured to secure together adjacently positioned ones of the panels 12. The connectors 22 each extend through one of the panel eyelets 20 of one of the panels 12 and one of the panel eyelets 20 of an adjacently positioned one of the panels 12 to secure the panels 12 together. Each of a plurality of traversing straps 24 is positionable adjacent to a juncture of adjacently positioned panels 12. The traversing straps 24 each extends over the roof 1. Each of the traversing straps 24 includes a plurality of strap eyelets 26 extending therethrough. The connectors 22 extend through an adjacently positioned one of the strap eyelets 26 to secure the panels 12 to the traversing straps 24.

A plurality of eave junctures is defined at each location of a juncture of one of the traversing straps 24 and one of a plurality of eaves 3 of the roof 1. Each of the eave junctures has one of a plurality of edge guards 28 positioned thereon and positioned between corresponding ones of the eaves 3 and the traversing straps 24 each to inhibit the roof 1 and the traversing straps 24 damaging each other. Each of the edge guards 28 includes a top wall 30 extending along a portion of the roof 1 and a side wall 32 being coupled to and extending at an angle to the top wall 30. The side wall 32 extends over an edge of the roof 1.

Each of a plurality of anchoring pins 34 is coupled to a support surface. Each of a plurality of anchoring straps 36 is coupled to and extends between one of the traversing straps 24 and one of the anchoring pins 34. A length of each of the anchoring straps 36 is adjustable to permit the traversing straps 24 to be pulled tight over the roof 1 when the anchoring straps 36 are shortened.

In use, the panels 12 are position on the roof 1 of the structure 2 and positioned between traversing straps 24 extending over the roof 1. The connectors 22 are used to secure the panels 12 together and to the traversing straps 24. The anchoring straps 36 are then shortened to tighten the traversing straps 24 against the roof 1 and secure the panels 12 in place to inhibit high winds from getting under the roof covering and stripping the roof covering from the roof 1 and inhibiting the roof 1 being lifted from the structure 2.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A roof securing system comprising:
a roof having a pair of bottom edges and an apex;
a plurality of panels, each of said panels being positioned on the roof of the structure to inhibit a roof covering from being removed by the high winds, said panels being selectively coupled together to cover the roof;
a plurality of connectors being configured to secure together adjacently positioned ones of said panels;
a plurality of traversing straps extending from one of said bottom edges of said roof to another one of said bottom edges of said roof and over an apex of said roof, each of said traversing straps being coupled to and coupling together vertically adjacent ones of said panels;
a plurality of anchoring pins, each of said anchoring pins being coupled to a support surface; and
a plurality of anchoring straps, each of said anchoring straps being coupled to and extending between one of said traversing straps and one of said anchoring pins to secure said traversing straps against the roof.

2. The system according to claim 1, wherein each of panels includes a mesh portion being liquid permeable.

3. The system according to claim 2, wherein each of panels includes a border portion being coupled to and coextensive with a perimeter edge of said mesh portion.

4. The system according to claim 3, wherein each of panels includes a plurality of panel eyelets being coupled to and extending through said border portion, each of said connectors extending through one of said panel eyelets of one of said panels and one of said panel eyelets of an adjacently positioned one of said panels to secure said panels together.

5. The system according to claim 1, wherein each of said traversing straps includes a plurality of strap eyelets extending therethrough, said connectors extending through adjacently positioned one of said strap eyelets to secure said panels to said traversing straps.

6. The system according to claim 1, further comprising a plurality of edge guards, a plurality of cave junctures being defined at each location of a juncture of one of said traversing straps and one of a plurality of eaves of the roof, each of said cave junctures having one of said edge guards positioned thereon and positioned between corresponding ones of said eaves and said traversing straps each to inhibit the roof and said traversing straps damaging each other.

7. The system according to claim 6, wherein each of said edge guards includes a top wall extending along a portion of the roof and a side wall being coupled to and extending at an angle to said top wall, said side wall extending over an edge of the roof.

8. The system according to claim 1, wherein a length of each of said anchoring straps is adjustable to permit said traversing straps to be pulled tight over the roof when said anchoring straps are shortened.

9. A roof securing system for inhibiting damage to a roof of a structure from high winds, said system comprising:
a plurality of panels, each of said panels being positioned on the roof of the structure to inhibit a roof covering from being removed by the high winds, said panels being selectively coupled together to cover the roof, each of panels comprising;
a mesh portion being liquid permeable;
a border portion being coupled to and coextensive with a perimeter edge of said mesh portion;
a plurality of panel eyelets being coupled to and extending through said border portion;
a plurality of connectors being configured to secure together adjacently positioned ones of said panels, each of said connectors extending through one of said panel eyelets of one of said panels and one of said panel eyelets of an adjacently positioned one of said panels to secure said panels together;
a plurality of traversing straps, each of said traversing straps being positionable adjacent to a juncture of adjacently positioned panels, each of said traversing straps extending over the roof, each of said traversing straps including a plurality of strap eyelets extending therethrough, said connectors extending through adjacently positioned one of said strap eyelets to secure said panels to said traversing straps;
a plurality of edge guards, a plurality of eave junctures being defined at each location of a juncture of one of said traversing straps and one of a plurality of eaves of the roof, each of said eave junctures having one of said edge guards positioned thereon and positioned between corresponding ones of said eaves and said traversing straps each to inhibit the roof and said traversing straps damaging each other, each of said edge guards including a top wall extending along a portion of the roof and a side wall being coupled to and extending at an angle to said top wall, said side wall extending over an edge of the roof;
a plurality of anchoring pins, each of said anchoring pins being coupled to a support surface; and
a plurality of anchoring straps, each of said anchoring straps being coupled to and extending between one of said traversing straps and one of said anchoring pins, a length of each of said anchoring straps being adjustable to permit said traversing straps to be pulled tight over the roof when said anchoring straps are shortened.

* * * * *